United States Patent
Yoon et al.

(10) Patent No.: US 8,514,823 B2
(45) Date of Patent: Aug. 20, 2013

(54) METHOD FOR SUPPORTING COEXISTENCE IN A MOBILE STATION

(75) Inventors: Won Yong Yoon, Gyeonggi-do (KR); Sung June Youn, Gyeonggi-do (KR); Ki Seon Ryu, Gyeonggi-do (KR); Hyo Sik Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1097 days.

(21) Appl. No.: 12/392,500

(22) Filed: Feb. 25, 2009

(65) Prior Publication Data
US 2009/0213804 A1 Aug. 27, 2009

Related U.S. Application Data

(60) Provisional application No. 61/031,015, filed on Feb. 25, 2008, provisional application No. 61/034,155, filed on Mar. 6, 2008.

(30) Foreign Application Priority Data

Jun. 25, 2008 (KR) ........................ 10-2008-0060332

(51) Int. Cl.
*H04Q 7/24* (2006.01)
*H04J 3/16* (2006.01)

(52) U.S. Cl.
USPC .......................................... 370/338; 370/466

(58) Field of Classification Search
USPC .................. 370/252, 338, 465, 466
See application file for complete search history.

(56) References Cited

U.S. PATENT DOCUMENTS

| 5,966,378 | A | 10/1999 | Hamalainen |
| 7,764,658 | B2 | 7/2010 | Garrett et al. |
| 7,796,698 | B2 | 9/2010 | Koorapaty et al. |
| 7,826,459 | B2 | 11/2010 | Xhafa et al. |
| 7,907,572 | B2 | 3/2011 | Yang et al. |
| 7,929,432 | B2 | 4/2011 | Zhu et al. |
| 2002/0080749 | A1 | 6/2002 | Terry |
| 2004/0100939 | A1 | 5/2004 | Kriedte et al. |
| 2005/0147112 | A1 | 7/2005 | Sugaya |

(Continued)

FOREIGN PATENT DOCUMENTS

| JP | 2005080312 | 3/2005 |
| JP | 2007043660 | 2/2007 |

(Continued)

OTHER PUBLICATIONS

Anis Koubaa et al., "A Time Division Beacon Scheduling Mechanism for IEEE 802.15.4/Zigbee Cluster-Tree Wireless Sensor Networks", 19th Euromicro Conference on Real-Time Systems (ECRTS'07), 2007.

*Primary Examiner* — Andrew Lee
(74) *Attorney, Agent, or Firm* — Lee, Hong, Degerman, Kang & Waimey

(57) ABSTRACT

A method for supporting coexistence in a mobile station is provided. The method for supporting coexistence in the mobile station includes, at the mobile station, turning on Bluetooth at a start point of a WiMAX downlink subframe, stopping the operation of the Bluetooth if WiMAX channel quality of the mobile station becomes less than a threshold value during the operation of the Bluetooth, and, at the mobile station, turning off the operation of the Bluetooth at the start point of a WiMAX uplink subframe. Accordingly, it is possible to solve fragmentation by minimizing the interruption of the WiMAX transmission/reception and to improve WiMAX downlink throughput by restricting Bluetooth data transmission/reception according to the WiMAX channel quality.

18 Claims, 5 Drawing Sheets

(56) References Cited

U.S. PATENT DOCUMENTS

| | | |
|---|---|---|
| 2005/0174953 A1 | 8/2005 | Ho |
| 2005/0201309 A1 | 9/2005 | Kang et al. |
| 2005/0233709 A1 | 10/2005 | Gardner et al. |
| 2005/0271006 A1 | 12/2005 | Chari et al. |
| 2005/0276241 A1 | 12/2005 | Kamerman et al. |
| 2005/0276250 A1 | 12/2005 | Grieco et al. |
| 2006/0029031 A1 | 2/2006 | Koorapaty |
| 2006/0084383 A1 | 4/2006 | Ibrahim et al. |
| 2006/0148411 A1 | 7/2006 | Cho et al. |
| 2007/0153734 A1 | 7/2007 | Lee et al. |
| 2007/0165589 A1 | 7/2007 | Sakoda |
| 2007/0224936 A1* | 9/2007 | Desai ........................ 455/41.2 |
| 2007/0232358 A1 | 10/2007 | Sherman |
| 2007/0274273 A1* | 11/2007 | Grushkevich et al. ........ 370/338 |
| 2008/0025251 A1 | 1/2008 | Lee et al. |
| 2008/0056133 A1 | 3/2008 | Deshpande et al. |
| 2008/0137599 A1 | 6/2008 | Ham et al. |
| 2008/0159185 A1 | 7/2008 | Howard |
| 2008/0238807 A1* | 10/2008 | Ibrahim et al. ................ 343/876 |
| 2009/0040990 A1* | 2/2009 | Xhafa et al. ................... 370/338 |
| 2009/0054009 A1* | 2/2009 | Yang et al. ...................... 455/78 |
| 2009/0080401 A1* | 3/2009 | Zhu et al. ....................... 370/343 |
| 2009/0137206 A1* | 5/2009 | Sherman et al. ............. 455/41.2 |
| 2011/0002291 A1* | 1/2011 | Gonikberg et al. ........... 370/329 |
| 2011/0194506 A1* | 8/2011 | Hirsch et al. .................. 370/329 |
| 2012/0034870 A9* | 2/2012 | Desai et al. ................... 455/41.2 |

FOREIGN PATENT DOCUMENTS

| | | |
|---|---|---|
| JP | 2007068070 | 3/2007 |
| KR | 1019990025877 | 4/1999 |
| KR | 1020040064823 | 7/2004 |
| WO | 2006/022530 | 3/2006 |
| WO | 2007/000691 | 1/2007 |
| WO | 2007031960 | 3/2007 |
| WO | 2007/070409 | 6/2007 |
| WO | 2007/078118 | 7/2007 |
| WO | 2007/091235 | 8/2007 |
| WO | 2007/091858 | 8/2007 |

* cited by examiner

METHOD FOR SUPPORTING COEXISTENCE IN A MOBILE STATION

Pursuant to 35 U.S.C. §119, this application claims the benefit of earlier filing date and right of priority to Korean Application No. 10-2008-0060332, filed on Jun. 25, 2008, and also claims the benefit of U.S. Provisional Application Ser. No. 61/031,015, filed on Feb. 25, 2008, and U.S. Provisional Application Ser. No. 61/034,155, filed Mar. 6, 2008, the contents of which are all incorporated by reference herein in their entirety.

BACKGROUND OF THE INVENTION

1. Field of the Invention

The present invention relates to the support of multi-radio coexistence in a mobile station using a broadband wireless access system, and more particularly, to a method for improving throughput of a broadband wireless access system and another wireless communication system.

2. Discussion of the Related Art

In a broadband wireless access system based on the IEEE 802.16e system, a sleep mode for minimizing power consumption of a mobile station is supported.

The mobile station requests a base station to transition to a sleep mode via a sleep mode request (MOB_SLP-REQ) message if downlink traffic is not transmitted from the base station to the mobile station during a predetermined time. Accordingly, the base station allows the sleep mode entry of the mobile station via a sleep mode response (MOB_SLP-RSP) message.

In the sleep mode, the operation of the mobile station is performed by the repetition of a sleep interval and a listening interval. A method of utilizing the IEEE 802.16e system in the listening interval and allowing the use of another wireless communication system such as Bluetooth or WiFi to provide coexistence of a time sharing scheme in the sleep interval is suggested.

FIG. 1 shows the support of coexistence of WiMax and Bluetooth if each of the listening interval and the sleep interval has a length of two frames.

In the related art, the support of multi-radio coexistence of an IEEE 802.16-based M-WiMAX mobile station with the IEEE 802.15-based Bluetooth or IEEE 802.11-based WiFi allows the Bluetooth or WiFi to use a portion of the listening interval and the sleep interval of the 802.16-based M-WiMAX mobile station and allows the M-WiMAX mobile station to communicate with an M-WiMAX base station in only a portion of the listening interval.

As shown in FIG. 1, in order to support coexistence with the Bluetooth, the WiMAX mobile station and the base station do not transmit/receive data to each other such that data is exchanged via the Bluetooth during the sleep interval after the mode of the mobile station is triggered to the sleep mode in which each of the listening interval and the sleep interval has two frames. In addition, even in the listening interval of the sleep mode, the WiMAX mobile station can transmit/receive data to/from the base station via a downlink subframe of a first frame and an uplink subframe of a second frame. The base station does not schedule an uplink subframe of the first frame and a downlink subframe of the second frame of the listening interval, for the Bluetooth.

It is possible to prevent Bluetooth data loss and throughput deterioration by allowing the Bluetooth to use the portion of the listening interval in the sleep mode of the mobile station.

FIG. 2 is a view showing the support of coexistence if each of a listening interval and a sleep interval has a length of one frame.

In FIG. 2, a mobile station receives a DL-MAP and a UL-MAP of $n^{th}$, $n+2^{th}$, and $n+4^{th}$ frames. Another communication system such as Bluetooth or WiFi is used in an interval in which the mobile station does not receive the DL-MAP and the UL-MAP (Non-802.16 Tx Interval).

The total throughput of a time sharing scheme cannot exceed 1, and throughput deterioration may occur due to the interruption of a transmission or reception operation which has been performed, that is, fragmentation, in a time boundary.

In addition, in the interference between the Bluetooth and the WiMAX, generally, the uplink transmission of the WiMAX mobile station has a significant influence on the data reception of the Bluetooth. In other words, the downlink data reception of the WiMAX mobile station may be influenced by the data transmission of the Bluetooth. In detail, if the reception quality of the WiMAX signal having a predetermined level or more is maintained, the data transmission of the Bluetooth does not have an influence on the downlink data reception of the WiMAX mobile station.

However, if the WiMAX channel quality falls to less than the predetermined level, the data transmission of the Bluetooth gives interference to the downlink data reception of the WiMAX mobile station and thus the WiMAX downlink throughput may deteriorate.

SUMMARY OF THE INVENTION

Accordingly, the present invention is directed to a method for supporting coexistence in a mobile station that substantially obviates one or more problems due to limitations and disadvantages of the related art.

An object of the present invention is to provide a method for supporting coexistence in a mobile station capable of sharing a time by restricting uplink and downlink data scheduling so as to disallow another communication system such as Bluetooth to use a predetermined time period of WiMAX according to a WiMAX channel quality variation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for supporting coexistence in a mobile station includes, at the mobile station, turning on Bluetooth at a start point of a WiMAX downlink subframe, stopping the operation of the Bluetooth if WiMAX channel quality of the mobile station becomes less than a threshold value during the operation of the Bluetooth, and, at the mobile station, turning off the operation of the Bluetooth at the start point of a WiMAX uplink subframe.

In the step of stopping the operation of the Bluetooth, a media access control (MAC) message indicating the stop of the operation of the Bluetooth may be transmitted from the mobile station to a base station.

In the step of stopping the operation of the Bluetooth, the operation of the Bluetooth may be resumed if the channel quality of the mobile station becomes more than a threshold value. In the step of resuming the operation of the Bluetooth, a media access control (MAC) message indicating the resuming of the operation of the Bluetooth may be transmitted from the mobile station to the base station.

The threshold value may vary according to the transmission power level of the Bluetooth.

In another aspect of the present invention, a method for supporting coexistence in a mobile station includes, at the mobile station, turning on Bluetooth at a start point of a WiMAX downlink subframe when a DCD message including coexistence mode trigger information is received from a base station; stopping the operation of the Bluetooth if WiMAX channel quality of the mobile station becomes less than a threshold value during the operation of the Bluetooth; and, at the mobile station, turning off the operation of the Bluetooth at a start point of a WiMAX uplink subframe.

The DCD message may include the threshold value.

In another aspect of the present invention, a method for supporting coexistence in a mobile station includes transmitting a throughput request (SBC-REQ) message to a base station in a network entry process of the mobile station; at the mobile station, turning on Bluetooth at a start point of a WiMAX downlink subframe when a throughput response (SBC-RSP) message including coexistence mode trigger information is received in correspondence with the throughput request (SBC-REQ) message; stopping the operation of the Bluetooth if WiMAX channel quality of the mobile station becomes less than a threshold value during the operation of the Bluetooth; and, at the mobile station, turning off the operation of the Bluetooth at a start point of a WiMAX uplink subframe.

The throughput response (SBC-RSP) message may include the threshold value.

In another aspect of the present invention, a method for supporting coexistence in a mobile station includes transmitting a registration request (REG-REQ) message to a base station in a network entry process of the mobile station; at the mobile station, turning on Bluetooth at a start point of WiMAX downlink subframe when a registration response (REG-RSP) message including coexistence mode trigger information is received in correspondence with the registration request (REG-REQ) message; stopping the operation of the Bluetooth if WiMAX channel quality of the mobile station becomes less than a threshold value during the operation of the Bluetooth; and, at the mobile station, turning off the operation of the Bluetooth at a start point of a WiMAX uplink subframe.

The registration response (REG-RSP) message may include the threshold value.

According to the embodiments of the present invention, it is possible to solve fragmentation by minimizing the interruption of the WiMAX transmission/reception and to improve WiMAX downlink throughput by restricting Bluetooth data transmission/reception according to the WiMAX channel quality.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
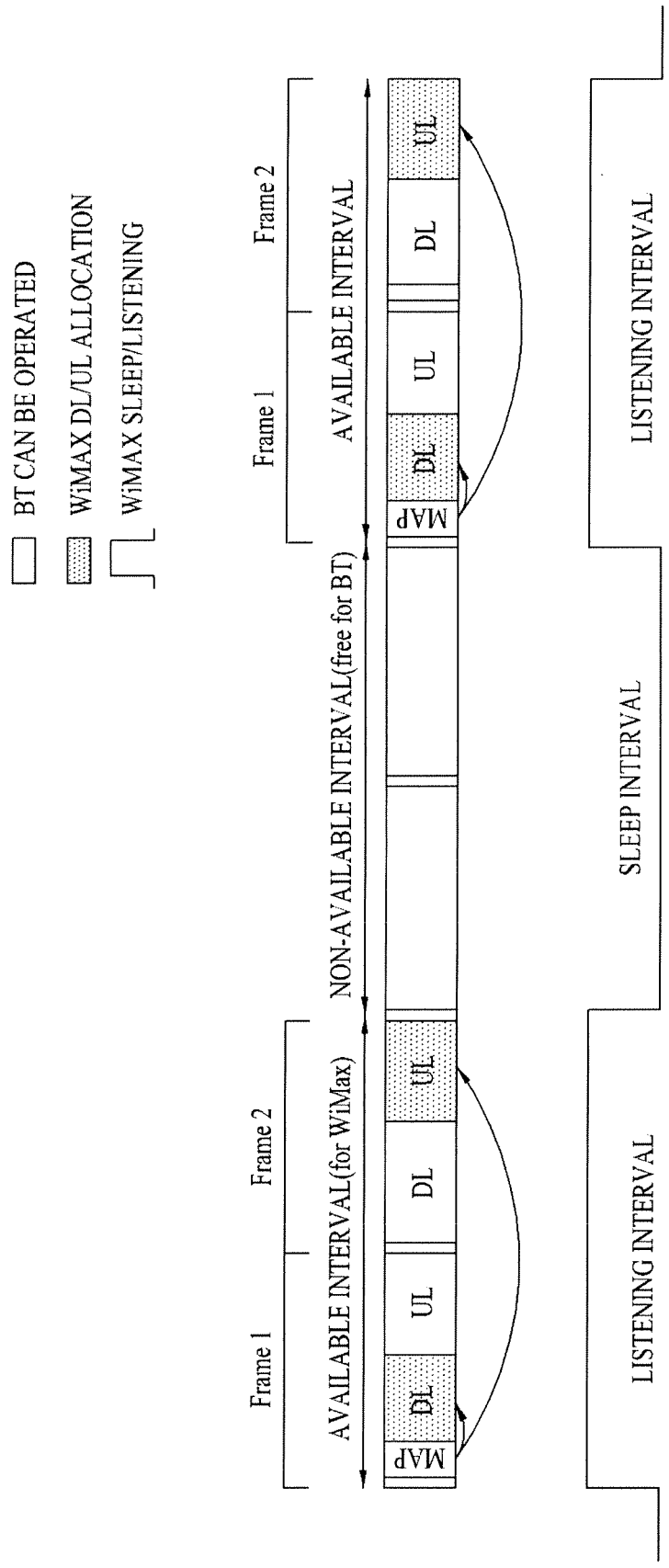
FIG. 1 is a view showing the support of coexistence of WiMAX and Bluetooth if each of a listening interval and a sleep interval has a length of two frames.
Figure 2:
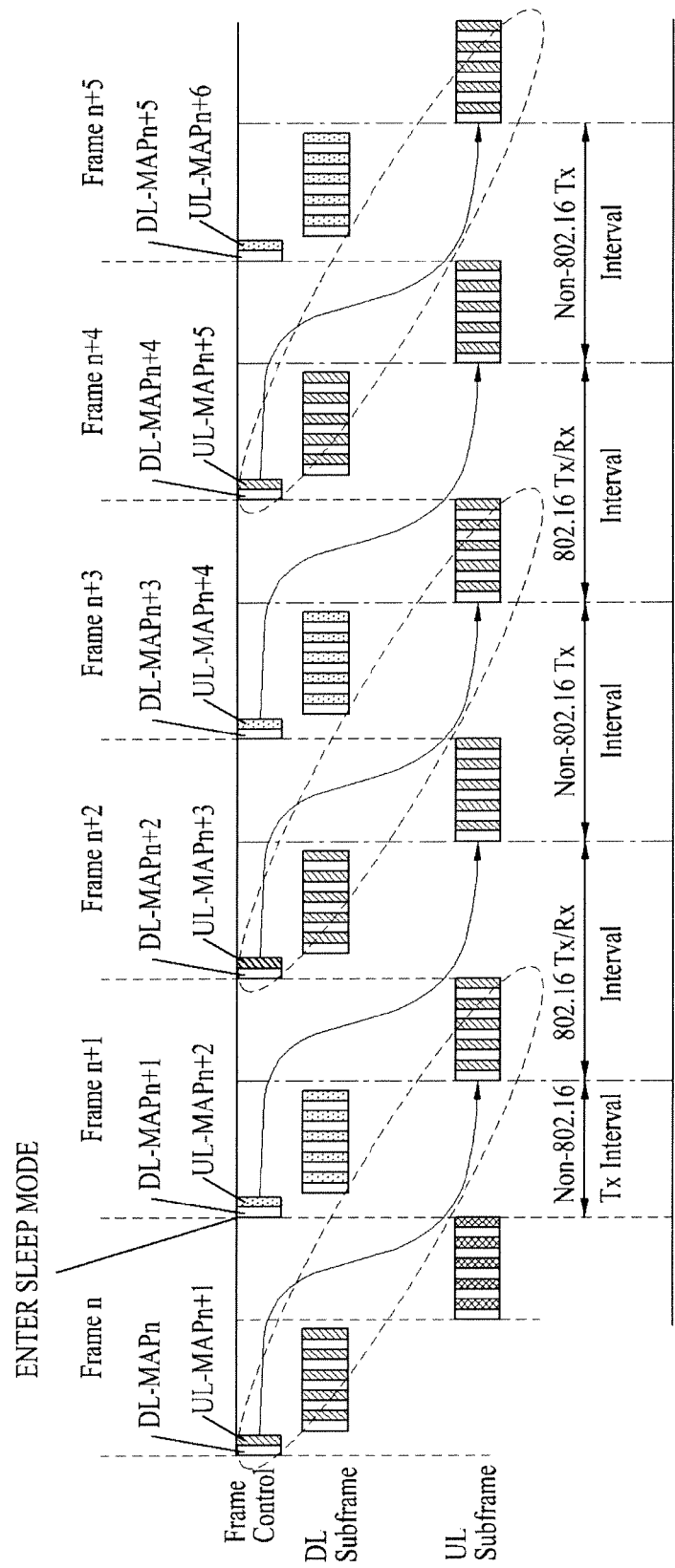
FIG. 2 is a view showing the support of coexistence if each of a listening interval and a sleep interval has a length of one frame.

Reference will now be made in detail to the preferred embodiments of the present invention, examples of which are illustrated in the accompanying drawings. However, the embodiments of the present invention may be variously modified and the range of the present invention is not limited to the following embodiments.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The specific terms used in the following description are provided for facilitating the understanding of the present invention, and the use of the specific terms may be variously changed without departing from the technical scope of the present invention.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with an user equipment (UE), a mobile station (MS) or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The embodiments of the present invention are applicable to the support of existence of primary communication such as WiMAX with secondary communication such as WPAN (Wireless Personal Area Network) radio based on the IEEE 802.15 standard, such as Bluetooth, and WLAN radio based on the IEEE 802.11 standard, such as WiFi.

Figure 3:
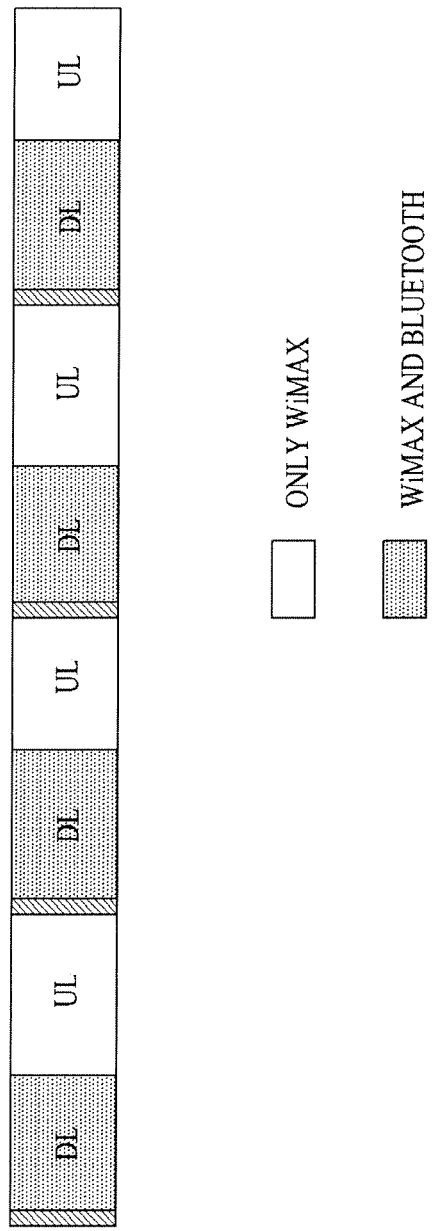
FIG. 3 is a view showing the support of existence according to an embodiment of the present invention.

FIG. 3 is a view showing the support of existence according to an embodiment of the present invention.

FIG. 3 shows an example in which data transmission/reception of WiMAX and Bluetooth is simultaneously allowed during a WiMAX downlink subframe.

As shown in FIG. 3, if a WiMAX mobile station maintains the channel quality of a WiMAX radio link having a predetermined level or more, WiMAX downlink reception and Bluetooth data transmission/reception is possible during the WiMAX downlink subframe. If the Bluetooth data transmission/reception is allowed during the WiMAX downlink subframe and the Bluetooth is turned off during a WiMAX uplink subframe such that only the WiMAX data transmission is possible, coexistence is possible without throughput deterioration due to interference between the WiMAX and the Bluetooth.

Accordingly, in the present invention, an operation for supporting coexistence is differently defined when the channel quality of the WiMAX radio link is maintained at the predetermined level or more and when the channel quality of the WiMAX radio link falls to less than the predetermined level, in order to minimize the throughput deterioration of the WiMAX and the Bluetooth.

Figure 4:
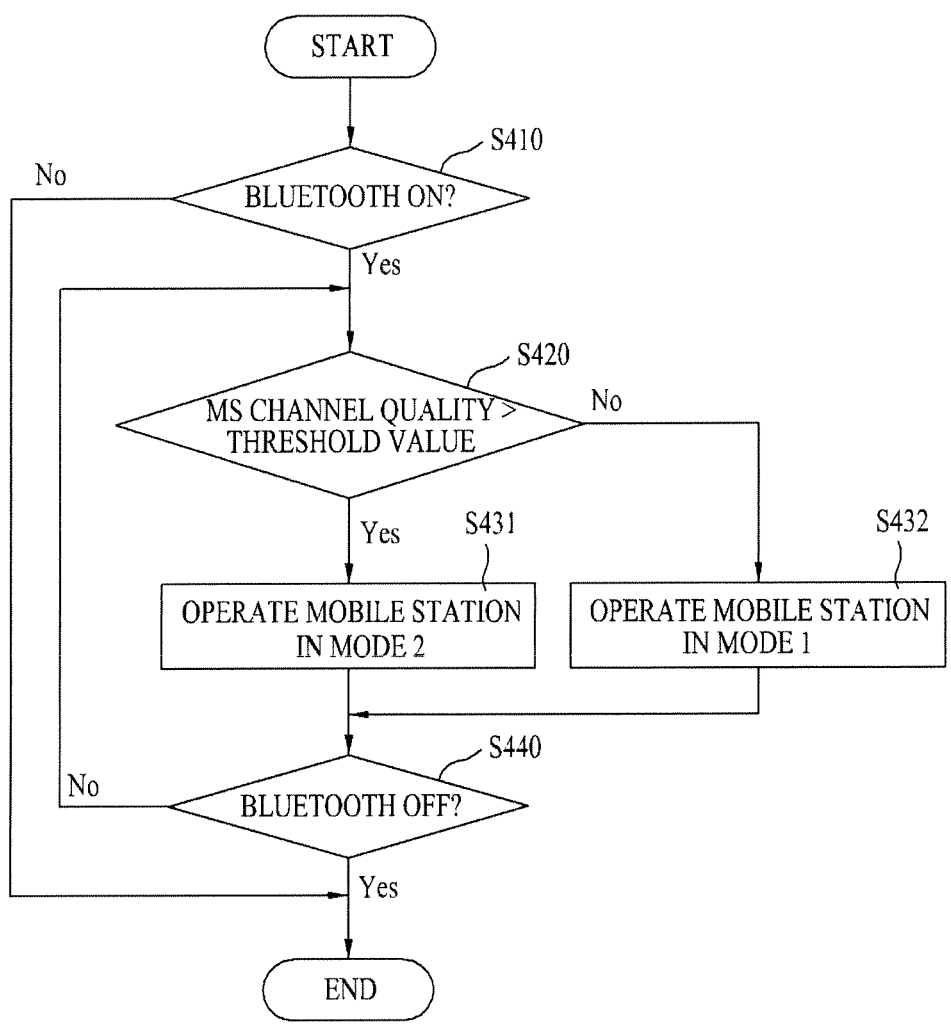
FIG. 4 is a flowchart illustrating a method for supporting coexistence according to an embodiment of the present invention.

FIG. 4 is a flowchart illustrating a method for supporting coexistence according to an embodiment of the present invention.

A mobile station turns on Bluetooth at a start point of a WiMAX downlink subframe (S410). This step S410 is repeated at the start point of the downlink subframe of every frame.

Hereinafter, a coexistence operational mode 1 indicates a time sharing scheme of the WiMAX and the Bluetooth using a sleep mode. In addition, a coexistence operational mode 2 indicates a method for transmitting/receiving data via both the WiMAX and the Bluetooth during the WiMAX downlink subframe. In embodiments of the present invention, the coexistence operation mode 1 and the coexistence operation mode 2 are also called as a co-located coexistence mode 1 and a co-located coexistence mode 2 thereof.

Next, if the WiMAX channel quality of the mobile station becomes less than a threshold value during the operation of the Bluetooth (S420), the mobile station is operated in the coexistence operational mode 1 (S432). That is, the operation of the Bluetooth is stopped. In contrast, if the WiMAX channel quality of the mobile station becomes more than the threshold value while the operation of Bluetooth is stopped (S420), the mobile station is operated in the coexistence operational mode 2 (S431). That is, the operation of the Bluetooth is resumed.

Next, if the Bluetooth is arbitrarily turned off or the operation of the Bluetooth is turned off at the start point of the WiMAX uplink subframe (S440), the method is finished. In contrast, if the Bluetooth is not turned off, the steps S420 to S440 are repeated.

Hereinafter, a condition 2 is a condition for triggering the mode of the mobile station to the co-located coexistence mode 2. For example, if the channel quality of the WiMAX radio link of the mobile station is more than a given threshold value, the co-located coexistence mode 2 is used. A condition 1 is a condition for triggering the mode of the mobile station to the co-located coexistence mode 1. For example, if the channel quality of the WiMAX radio link is less than the threshold value, the co-located coexistence mode 1 is used. The channel quality used herein is unrelated to a value which quantitatively represents the channel quality between the base station and the mobile station, such as a carrier-to-interference-plus-noise-ratio (CINR) or a receive signal strength indicator (RSSI). If the channel quality exceeds the threshold value as the result of continuously monitoring the quality of the WiMAX reception signal while the mobile station is operated in a specific coexistence operational mode, the coexistence operational mode may be newly changed. For example, it may be determined whether or not the mode is triggered, according to the result of monitoring the channel quality during a predetermined time period.

The threshold value may vary according to the Bluetooth transmission power level of the mobile station. Accordingly, the threshold value may be stored in the form of a vector. The threshold value vector may be stored as a constant or a variable of the mobile station without communication with the base station. Alternatively, the base station may inform the mobile station of the threshold value vector via a specific message. For example, new sleep mode trigger information (threshold limit value (TLV)) may be defined, and the threshold value vector may be added to the defined threshold limit value (TLV).

When the WiMAX downlink subframe is started, a WiMAX chip may transmit a signal to a Bluetooth chip via a wire and inform that a transmission/reception (Tx/Rx) operation can be performed by the Bluetooth. If it is determined that the interference between the WiMAX transmission operation and the Bluetooth reception operation occurs when the WiMAX uplink subframe is started, then the WiMAX chip may transmit a signal to the Bluetooth chip via a wire so as to stop the operation of the Bluetooth chip. This process is repeated whenever the subframe is changed.

Figure 5:
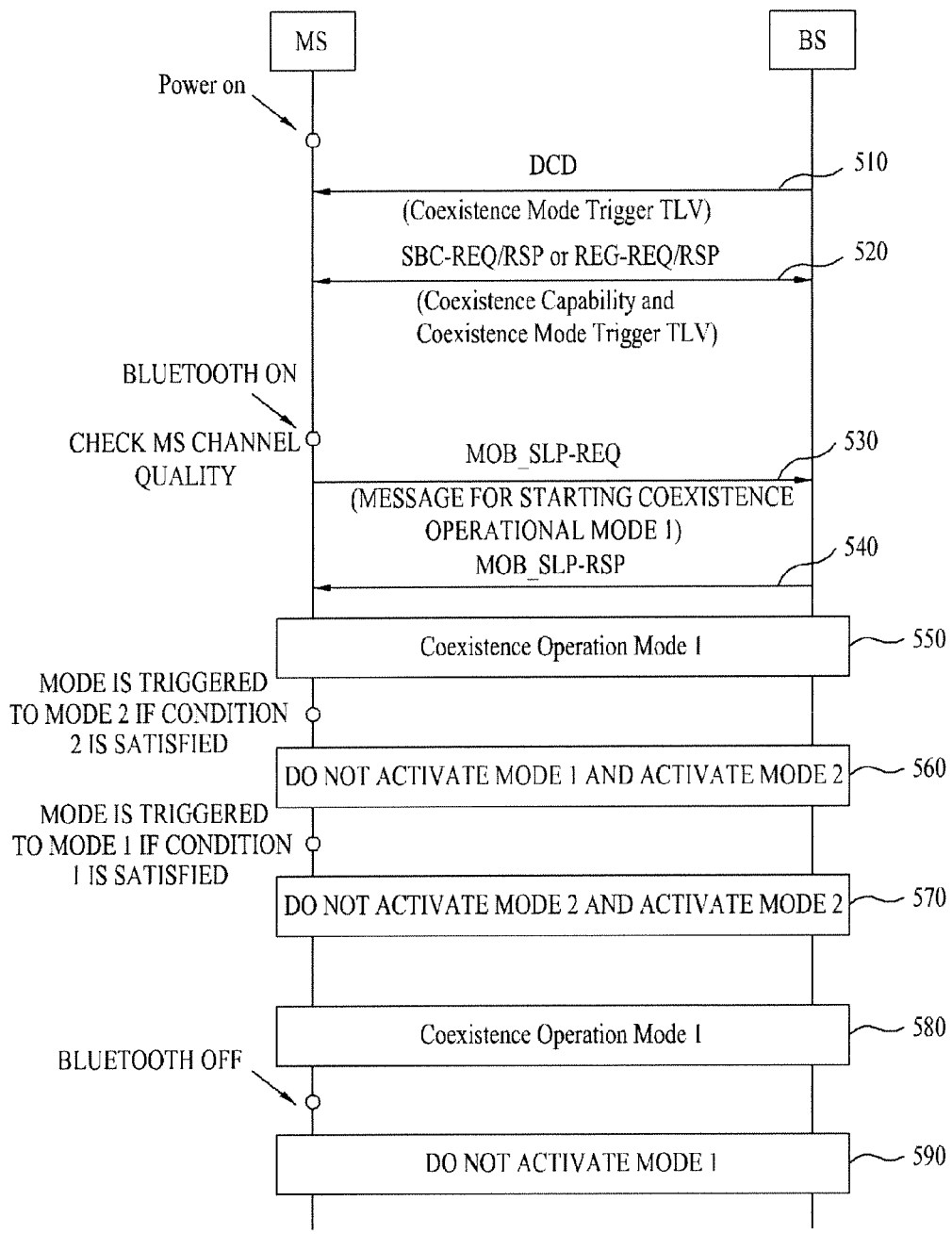
FIG. 5 is a signal flow diagram of a method for supporting coexistence according to another embodiment of the present invention.

FIG. 5 is a signal flow diagram of a method for supporting coexistence according to another embodiment of the present invention.

A base station may send coexistence mode trigger information to a mobile station via a downlink channel descriptor (DCD) transmitted in the form of a broadcasting message (510). The coexistence mode trigger information may be configured in the form of a type, a length and a value, that is, the form of a TLV. The coexistence mode trigger information may comprises a co-located Coexistence Enable TLV and/or a sleep mode functions enabled in H-FDD TLV.

The coexistence mode trigger information provides a threshold value of channel quality for triggering the mode of the mobile station to a coexistence mode. Alternatively, the coexistence mode trigger information may be sent to the mobile station via basic throughput messages (SBC-REQ/RSP) transmitted/received to/from the base station as a throughput parameter in a network entry process in which the mobile station is first registered in the base station (520).

Alternatively, the coexistence mode trigger information may be sent to the mobile station via registration messages (REG-REQ/RSP) transmitted/received to/from the base station in a process in which the WiMAX mobile station first requests registration to the base station (520).

If the mobile station stores the threshold value as the variable of the mobile station, the above-described message exchange process is not required. In addition, a coexistence capability field may be transmitted via the basic throughput messages (SBC-REQ/RSP) or the registration messages (REG-REQ/RSP). The coexistence capability field allows the base station to inform the mobile station that the base station can support a coexistence mode or allows the mobile station to inform the base station that the mobile station can support a coexistence mode.

If the WiMAX mobile station completes a network registration process and the Bluetooth is turned on, the mobile station checks a channel status and sets the coexistence operational mode.

By transmitting/receiving a sleep mode request (MOB_SLP-REQ) message and a slip mode response (MOB_SLP-RSP) message including the parameter indicating the set coexistence operational mode between the WiMAX mobile station and the base station, a sleep mode operation for supporting coexistence may be started (530 and 540).

If the channel status is bad by referring to the sleep mode trigger parameter, the mobile station sends a sleep mode request (MOB_SLP-REQ) message to the base station in order to enter the coexistence operational mode 1. The base station which receives this message sends a sleep mode response (MOB_SLP-RSP) message to the mobile station, and the mobile station triggers the mode thereof to the sleep mode for supporting the coexistence mode and performs the WiMAX and Bluetooth operation (550).

When the channel status of the mobile station which is being operated in the coexistence operational mode 1 (550) is improved and the condition 2 is satisfied, the mobile station and the base station perform MAC signaling, for triggering the mode to the coexistence operational mode 2 (560). The MAC signaling indicates the exchange of the sleep mode request/response message or the other signaling headers between the mobile station and the base station.

If the channel status of the mobile station which is being operated in the coexistence operational mode 2 becomes bad and the trigger condition of the condition 1 is satisfied, the mobile station and the base station perform MAC signaling, for triggering the mode to the coexistence operational mode 1 (570). The MAC signaling indicates the exchange of the sleep mode request/response message or the other signaling headers between the mobile station and the base station.

If the Bluetooth is turned off in the mobile station which is being operated in the coexistence operational mode 1 (580), the mobile station completes the coexistence operational mode (590). When the mobile station is operated in the coexistence operational mode 1, the mobile station and the base station perform MAC signaling in order to complete the sleep mode for coexistence (590) The MAC signaling indicates the exchange of the sleep mode request/response message or the other signaling headers between the mobile station and the base station.

The above-described operation should be changed if the WiMAX mobile station performs handover or the sleep mode should be completed in order to update system information of channel identifiers broadcasted from the base station. For example, the mobile station which is operated in the coexistence operational mode 1 needs to be updated due to the change of the channel identifier of the base station, the coexistence operational mode 1 is interrupted, the channel identifier is received and updated from the base station, and the coexistence operational mode 1 is resumed. The mobile station and the base station may perform the MAC signaling for resuming the coexistence operational mode 1. The MAC signaling indicates the exchange of the sleep mode request/response message or the other signaling headers between the mobile station and the base station.

The present invention relates to a method for improving the throughput of a broadband wireless access system and another wireless communication system, and is applicable to the support of coexistence of main communication such as WiMAX with WPAN radio communication based on the IEEE 802.15 standard and WLAN radio communication based on the IEEE 802.11 standard.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for supporting a coexistence mode that supports Worldwide Interoperability for Microwave Access (WiMAX) and Bluetooth communication systems in a mobile station, the method comprising:
    activating an operation of the Bluetooth communication system at a downlink subframe of the mobile station; and
    triggering the coexistence mode according to a channel quality of the mobile station during the operation of the Bluetooth communication system,
    wherein triggering the coexistence mode includes triggering a mode for resuming the operation of the Bluetooth communication system when the channel quality is greater than a threshold value, and
    wherein the threshold value varies according to a transmission power level of the Bluetooth communication system.

2. The method of claim 1, wherein triggering the coexistence mode includes transmitting a media access control (MAC) message from the mobile station, the MAC message indicating a stop of the operation of the Bluetooth communication system.

3. The method of claim 1, wherein triggering the mode for resuming the operation of the Bluetooth communication system includes transmitting a media access control (MAC) message from the mobile station, the MAC message indicating a resumption of the operation of the Bluetooth communication system.

4. A method for supporting a coexistence mode that supports Worldwide Interoperability for Microwave Access (WiMAX) and Bluetooth communication systems in a mobile station, the method comprising:
    transmitting a message including a coexistence capability field from the mobile station;
    activating an operation of the Bluetooth communication system at a downlink subframe of the mobile station when a message including coexistence mode trigger information is received at the mobile station; and
    triggering the coexistence mode according to a channel quality of the mobile station during the operation of the Bluetooth communication system.

5. The method of claim 4, wherein triggering the coexistence mode includes triggering a mode for resuming the operation of the Bluetooth communication system when the channel quality of the mobile station is greater than a threshold value.

6. A method for supporting a coexistence mode that supports a Worldwide Interoperability for Microwave Access (WiMAX) communication system and a secondary wireless communication system, the method comprising:
   estimating downlink (DL) channel quality of a WiMAX base station;
   determining the coexistence mode as either a first coexistence mode or a second coexistence mode according to the estimated DL channel quality; and
   triggering the determined coexistence mode to support coexistence with the secondary wireless communication system,
   wherein triggering the determined coexistence mode includes transmitting a sleep mode request (MOB_SLP-REQ) message including first coexistence information that triggers the determined coexistence mode of the WiMAX base station.

7. The method of claim 6, further comprising receiving a sleep mode response (MOB_SLP-RSP) message including second coexistence information in response to the MOB_SLP-REQ message.

8. The method of claim 7, further comprising turning on the secondary wireless communication system according to the received second coexistence information.

9. The method of claim 7, further comprising requesting deactivation of the determined coexistence mode by transmitting the MOB_SLP-REQ message when the secondary wireless communication system is turned off, wherein the MOB_SLP-REQ message includes third coexistence information for deactivating the WiMAX base station.

10. The method of claim 6, wherein determining the coexistence mode includes determining a first coexistence mode as the coexistence mode when the estimated DL channel quality is less than a threshold value.

11. The method of claim 6, wherein determining the coexistence mode includes considering an interference from the secondary wireless communication system on the estimated DL channel quality.

12. The method of claim 6, wherein a first coexistence mode is a co-located coexistence mode 1 of the WiMAX communication system and a second coexistence mode is a co-located coexistence mode 2 of the WiMAX communication system.

13. A method for supporting a coexistence mode that supports a Worldwide Interoperability for Microwave Access (WiMAX) communication system and a secondary wireless communication system, the method comprising:
   estimating downlink (DL) channel quality of a WiMAX base station;
   determining the coexistence mode as either a first coexistence mode or a second coexistence mode according to the estimated DL channel quality;
   triggering the determined coexistence mode to support coexistence with the secondary wireless communication system;
   transmitting a registration request (REG-REQ) message including coexistence capability information to the base station; and
   receiving a registration response (REG-RSP) message including information about a support of the coexistence mode in response to the transmitted REG-REQ message,
   wherein the determined coexistence mode is triggered only when the determined coexistence mode is negotiated between the mobile station and the WiMAX base station.

14. A method for supporting a coexistence mode that supports a Worldwide interoperability for Microwave Access (WiMAX) communication system and a secondary wireless communication system of a mobile station, the method comprising:
   receiving a sleep mode request (MOB_SLP-REQ) message including first coexistence information for triggering the coexistence mode of the mobile station;
   transmitting a sleep mode response message (MOB_SLP-RSP) including second coexistence information in response to the transmitted MOB_SLP-REQ message; and
   allocating resources of the mobile station according to the transmitted second coexistence information.

15. The method of claim 14, further comprising determining the coexistence mode is determined as either a first coexistence mode or a second coexistence mode according to an estimated downlink (DL) channel quality of the mobile station.

16. The method of claim 14, further comprising deactivating the determined coexistence mode when the received MOB_SLP-REQ message includes third coexistence information for deactivating the mobile station.

17. The method according to claim 14, further comprising:
   receiving a registration request (REG-REQ) message including coexistence capability information at the mobile station; and
   transmitting a registration response (REG-RSP) message comprising information about a support of the coexistence mode at the mobile station in response to the received REG-REQ message.

18. The method of claim 15, wherein the first coexistence mode is a co-located coexistence mode 1 of the WiMAX communication system and the second coexistence mode is a co-located coexistence mode 1 of the WiMAX communication system.

\* \* \* \* \*